(12) United States Patent
Rao et al.

(10) Patent No.: US 7,406,248 B1
(45) Date of Patent: Jul. 29, 2008

(54) DIGITAL IMAGE RETRIEVAL AND STORAGE

(75) Inventors: Abhijit B. Rao, Irvine, CA (US); Donald P. Gibson, Yorba Linda, CA (US); Brian M. Keane, Jr., Irvine, CA (US); Lionel Gregory Croom, Irvine, CA (US); Costin Valeriu Cozianu, Irvine, CA (US); Douglas Richard Barr, Laguna Beach, CA (US); Paul Gacek, Laguna Beach, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1240 days.

(21) Appl. No.: 09/723,976

(22) Filed: Nov. 28, 2000

(51) Int. Cl.
*H04N 5/91* (2006.01)

(52) U.S. Cl. .................. 386/46; 386/83; 386/117; 725/100

(58) Field of Classification Search .................. 386/46, 386/52, 55; 709/200; 348/231.2; 725/91, 725/100, 131
See application file for complete search history.

(56) References Cited

U.S. PATENT DOCUMENTS

| | | | |
|---|---|---|---|
| 4,811,385 A * | 3/1989 | Watanabe | 379/100.09 |
| 4,827,347 A | 5/1989 | Bell | 358/244 |
| 5,581,299 A | 12/1996 | Raney | 348/232 |
| 5,606,365 A | 2/1997 | Maurinus et al. | 348/222 |
| 5,633,678 A | 5/1997 | Parulski et al. | 348/232 |
| 5,806,005 A | 9/1998 | Hull et al. | 455/566 |
| 5,861,918 A | 1/1999 | Anderson et al. | 348/233 |
| 6,017,157 A | 1/2000 | Garfinkle et al. | 396/639 |
| 6,058,428 A | 5/2000 | Wang et al. | 709/232 |
| 6,133,985 A | 10/2000 | Garfinkle et al. | 355/40 |
| 6,449,767 B1 * | 9/2002 | Krapf et al. | 725/110 |
| 6,526,218 B1 * | 2/2003 | Matsumoto | 386/55 |
| 6,571,271 B1 * | 5/2003 | Savitzky et al. | 709/200 |
| 6,636,259 B1 * | 10/2003 | Anderson et al. | 348/211.3 |
| 6,812,961 B1 * | 11/2004 | Parulski et al. | 348/231.2 |

* cited by examiner

*Primary Examiner*—Hyu T Nguyen
(74) *Attorney, Agent, or Firm*—Fitzpatrick, Cella, Harper & Scinto

(57) ABSTRACT

The present invention relates to the retrieval and storage of image data captured using a digital image acquisition device such as a still camera, a video camera or a scanning device, and of image data stored on removable storage media such as compact flash, smart and memory stick media. An image retrieval architecture is described such that image data may be retrieved from any digital image acquisition device and/or from removable storage media, and a "one-click" operation is available to minimize an amount of interaction needed to retrieve image data from the digital image acquisition device.

21 Claims, 9 Drawing Sheets

DIGITAL IMAGE RETRIEVAL AND STORAGE

BACKGROUND OF THE INVENTION

1. Field of the Invention

The present invention relates to the retrieval and storage of image data captured using a digital image acquisition device such as a still camera, a video camera or a scanning device, and of image data stored on removable storage media such as compact flash, smart and memory stick media. An image retrieval architecture is described such that image data may be retrieved from any digital image acquisition device and/or from removable storage media, and a "one-click" image upload operation is available to minimize an amount of interaction needed to retrieve image data from the digital image acquisition device.

2. Description of the Related Art

Digital cameras are becoming more popular, particularly as the quality of a captured image begins to approach the quality of analog cameras (e.g., 35MM cameras). However, there are still some drawbacks with digital cameras. For example, a digital camera has limited storage capacity which gives rise to a need to be able to transfer images captured by the digital camera to external storage. In addition, unlike analog images, the procedures for processing images require the user to use some sort of computing equipment (e.g., personal computer, or PC) to retrieve an image in the camera's storage and/or process a retrieved image.

Typically, a digital camera user must individually retrieve each image saved in the camera's storage for storage on the PC. The PC may be owned by the user or an acquaintance, or the user may make use of one of the photo kiosks located in a publicly-accessible place (e.g., stores, hotels, etc.). Individual selection of each image that is to be uploaded from the camera can be tedious and time consuming, and may be especially undesirable when the images are being uploaded using someone else's PC or a photo kiosk.

Further, a user may wish to upload the image to a server (e.g., an Internet server) such as a photo web server to store and/or process the image, to generate photo quality prints, or to share the image with other site users. To make use of the photo web server's capabilities, a user must first upload an image to a PC, then log onto the Internet, locate the server, locate the image stored on the PC that is to be uploaded and select an upload operation. The user uses client software (e.g., a browser) that executes on the PC to provide an interface with the photo web server that steps the user through the upload process. Once the user selects the submit button in the interface, the browser initiates a push operation to push the image onto the server. The photo web server receives the uploaded image and stores it on a server.

However, the conventional mechanisms used to upload a digital image have drawbacks. For example, in order to upload an image, the user must own or have access to a PC. In addition, the upload process involves multiple steps to first upload to the PC and then to a server. If the server is too busy to receive the image at the time it is initiated by the user, the user must repeat some or all of the previously-described upload steps. Further, the conventional mechanism assumes that the client PC has sufficient resources to store an image and to execute browser software that is capable of pushing an image from the PC's storage to the server.

U.S. Pat. No. 5,606,365, issued to Maurinus et al., describes a technique for transmitting sets of raw image information along with a camera identification code, or ID, from a Home Interface Control (HIC) such as a Set Top Box (STB) through an interactive television network to an interactive control node. The camera's ID is used to retrieve corrections and processing software for the camera, and the corrections are made to the image data using the camera's correction information and processing software. The correction information and processing software are either provided by the camera's manufacturer or the camera user.

Maurinus indicates that computing equipment that many households already have in the home, an HIC, may be used to upload image data. However, Maurinus identifies many uncertainties with respect to the manner in which the images are to be uploaded, using an HIC, to a server or cable head end (CHE). In fact, according to Maurinus, the configuration of an HIC had not yet been determined and Maurinus could not provide such specifics. In fact, Maurinus speculates that an HIC will likely be based on a powerful microprocessor-based computer. However, in actuality, an HIC, such as that provided by Scientific-American, Inc. and General Instrument Corporation, typically has limited processing resources.

In addition, according to Maurinus, to use the system a user must first register a camera and, as a result, an identification code, or ID, that identifies the camera is associated with the camera's correction information and software for correcting an image using the correction information.

Maurinus is silent with regard to an actual mechanism for uploading images from the camera to the HIC and to the control node. Maurinus is silent with regard to uploading images using an HIC where the HIC may need to be configured for use with multiple, different cameras.

Thus, it would be beneficial to have an image retrieval capability that provides an approach for uploading images, and that may be used with any manufacturer's cameras regardless of whether or not a camera has first been registered with a service provider.

SUMMARY OF THE INVENTION

The present invention relates to the retrieval and storage of image data captured using a digital image acquisition device such as a still camera, a video camera or a scanning device, and of image data stored on removable storage media such as compact flash, smart and memory stick media. An image retrieval architecture is described such that image data may be retrieved from any digital image acquisition device and/or from removable storage media, and a "one-click" operation is available to minimize an amount of interaction needed to retrieve image data from the digital image acquisition device.

In an aspect of the invention, a facility is provided for uploading images directly from a device to a server using upload software that executes on client computing equipment. According to this aspect of the invention, a broadband network such as that used to transmit broadcast (e.g., television) signals to a home. The present invention accommodates an upload bandwidth that may be just a fraction of the downstream, and provides a network centric storage and image manipulation capability.

The client upload software comprises two components, one which remains resident on the client, and another which is loaded when the client detects that a physical connection has been established with a device. The dynamically-loadable client upload software may be retrieved locally or from a server, and is selected based on the identification information of a device that is connected to the client.

The client upload software is configured to interface with driver software executing in the client (PC, STB, HIC, etc.), and interfaces with a server (e.g., a CHE, photo web server, etc.) during an upload operation. The driver software communicates with the device to retrieve digital images stored in the device.

Initially, the client upload software operates to establish a connection (e.g., a streaming connection) with the server. An upload proxy component executing on the server then manages the upload process so that the digital image data is retrieved from the device by the client and transmitted to the server. In effect, the client may act as a temporary buffer between the device and the server during the upload process. The server may postpone an upload if, for example, the server or network is otherwise busy. Once on the server, a digital image is stored in a data store by the upload proxy and may be retrieved for processing (i.e., image editing, printing, etc.).

Advantageously, the upload facility of the present invention allows a user to upload one or more images to a server. The operation appears to the user as a single operation, or step. There is no need for the user to first make a persistent, intermediate copy of each image at the client computing equipment and then initiate an upload of the stored image from the client to the server. Since a temporary buffer, or other storage, is all that is needed for the upload to a server, the client computing equipment needs minimal storage capacity.

Of course, it is possible with the present invention, to allocate memory according to its availability such that the client is able to store a persistent copy which may then be transmitted to the server, or processing in some manner. In so doing, it would be possible to allow the user to disconnect the device when transmission is delayed and before the images are actually uploaded to the server. However, in a case that the client computer has limited storage capacity, it is optionally provided to allow the device to remain connected to the client computer.

Regardless of whether the device remains connected, an image, or images, may be uploaded at a time when the server becomes available. That is, the server may initiate an operation to "pull" the image data at a time determined by the server. In a case that the device remains connected to the client computer, the image data may be retrieved from the device in response to an initiation of a pull operation by the server. Where the data is stored by the client, the persistent copy of the image data is used to transferred to the server.

To further accommodate a client computer's resource constraints or capabilities, the client upload software is preferably split into two components. A resident component and a dynamically-loadable component which is likely to be the larger of the two components. The dynamically-loadable component is initiated when an upload operation is to be performed, and need not be resident when no operation is being performed thereby freeing memory for other uses. In addition, to accommodate different digital image acquisition devices, different dynamically-loadable components may be written, and an appropriate one selected for uploading an image from the device. While a universal dynamically-loadable component may be used with the present invention, components geared for use with one or more specific devices may reduce the size of each dynamically-loadable component and consequently the amount of the client's memory that is needed for the component. It is possible with the present invention to have dynamically-loadable components for each device or a group of devices (e.g., devices from the same manufacturer).

Another aspect of the present invention is directed to a technique of uploading images from a device using a single selection, or click. A user interface is provided that includes a "One Click Upload" option that is selectable by, for example, a click of a button (e.g., of a mouse, television remote control or other pointing device) when the cursor is positioned on the option. In response to the single click, all of the images that are currently stored on the device are retrieved from the device and stored in an external image database. A unique identifier, or token, is generated which is associated with the stored images, and the token is saved in the device's storage. Thereafter, the images may be retrieved from the external storage using the token stored in the device. That is, the token is retrieved from the device and used to retrieve the associated images from the image database. The images may then displayed in such a way that the user may scroll through them to identify the ones that are to be retained or deleted.

Thus, by using the present invention, the user interaction needed to initially retrieve the images from a digital image acquisition device is minimized, and the browsing and selection of images may be deferred to a more convenient time and/or setting.

This brief summary has been provided so that the nature of the invention may be understood quickly. A more complete understanding of the invention can be obtained by reference to the following detailed description of the preferred embodiment(s) thereof in connection with the attached drawings.

DETAILED DESCRIPTION OF THE PREFERRED EMBODIMENTS

Figure 1:
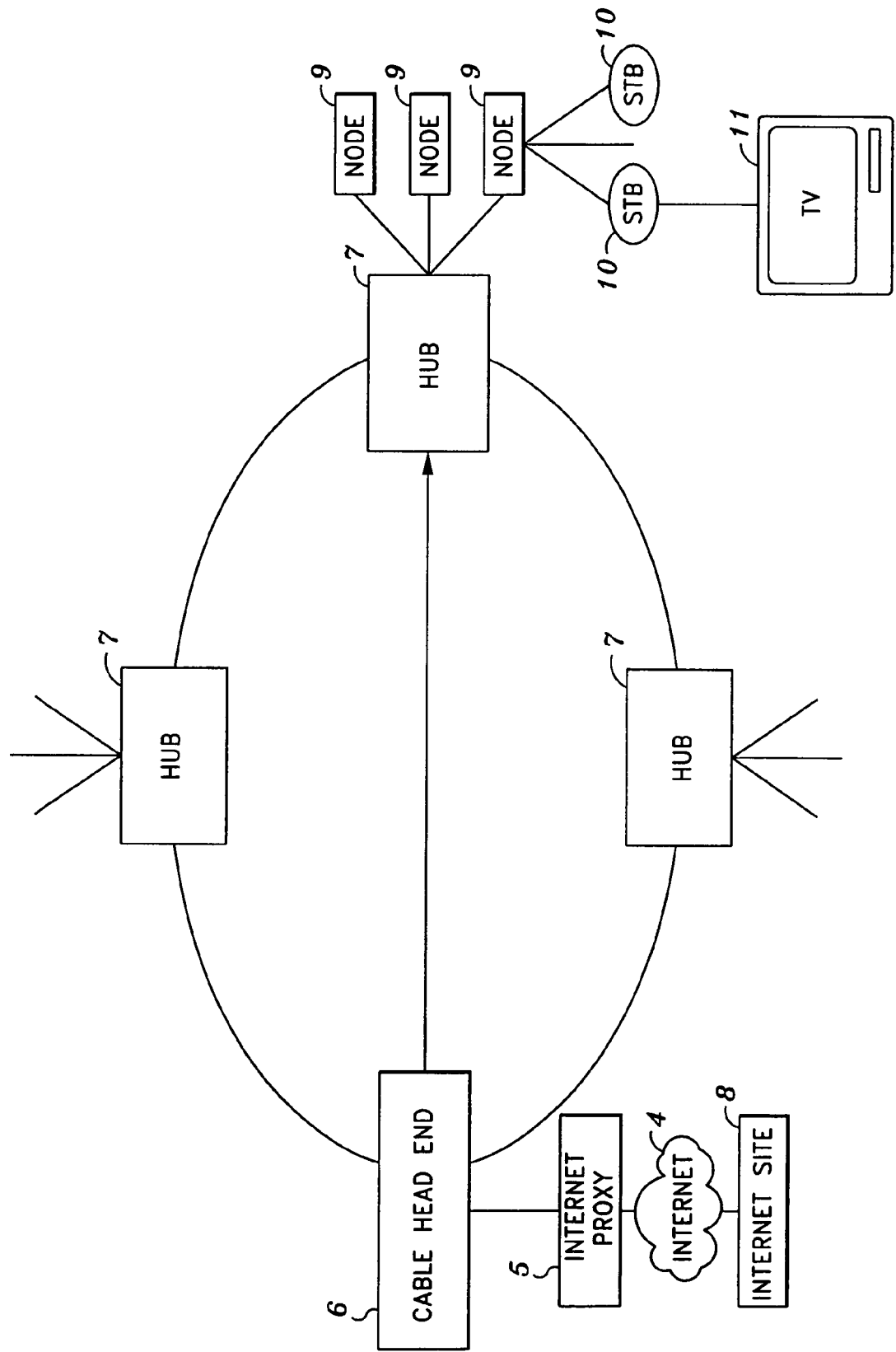
FIG. 1 is a representation of a cable broadband network embodying the present invention.

FIG. 1 illustrates a regional broadband digital cable network connected to the internet and utilizing the present invention. The network is capable of delivering analog and digital broadcasts, secure analog and digital broadcasts, analog and digital pay-per-view, analog and digital impulse pay-per-view, digital near video on demand, one-way real-time datagram (broadcast IP data packets), and two-way real-time datagram (addressed IP data packets). In addition, according to the present invention, the regional broadband digital cable network is used to transmit digital image data and associated information.

As shown in FIG. 1, the above-listed broadcast services may be delivered by value-added service provider systems and network control systems (not shown) located at cable head end (CHE) 6. Value-added service provider systems include digital satellite distribution systems, applications executing on cable servers (such as special-purpose applications like subscriber service application, content gather applications, etc.) and digital media servers outputting MPEG-2 datastreams. Network control systems provide management and control for the services supported by the broadband network.

Alternatively, services may be delivered from World Wide Web (WWW) 4 through internet proxy 5, for example, from internet site 8. Examples of internet site 8 include photo service providers, banking, retailing, utilities, and the like.

In either case, the services are delivered to Cable Head End (CHE) 6, which serves as an interface between the service providers and the rest of the broadband network.

In particular, CHE 6, which is responsible for providing services to multiple homes (e.g., approximately 500,000 to 1,000,000), is connected via fiber optic cabling to hubs 7, which are connected to CHE 6 or other hubs 7. Each hub 7 is, in turn, connected to at least one node 9, also using fiber optic cabling. Coaxial cable is then used to connect each node to Set Top Boxes (STB's) 10. For instance, the STB 10 may comprise one of several currently available STB models available such as Scientific Atlanta's Explorer series and General Instrument's DCT-2000 and DCT-5000+ models. While the present invention is described with regard to a STB, it should be apparent that any type of home interface control (HIC) that interfaces with a broadband network such as a digital cable network may be used. Finally, each STB 10 is connected to television 11 as well as other devices not shown (e.g., printer). Accordingly, services are delivered from a service provider to CHE 6, to one or more hubs 7, to node 9, to STB 10 and to television 11.

It should be noted that, by virtue of the foregoing arrangement, a service infrastructure may be distributed among CHE 6, hubs 7, or other facilities. Further, while the present invention is described with reference to a digital cable network of FIG. 1, it should be apparent that any broadband network interconnection may also be used between a client such as STB 10 and a server such as CHE 6. For example, it is possible to use a satellite, or other connection, with the present invention.

Figure 2:
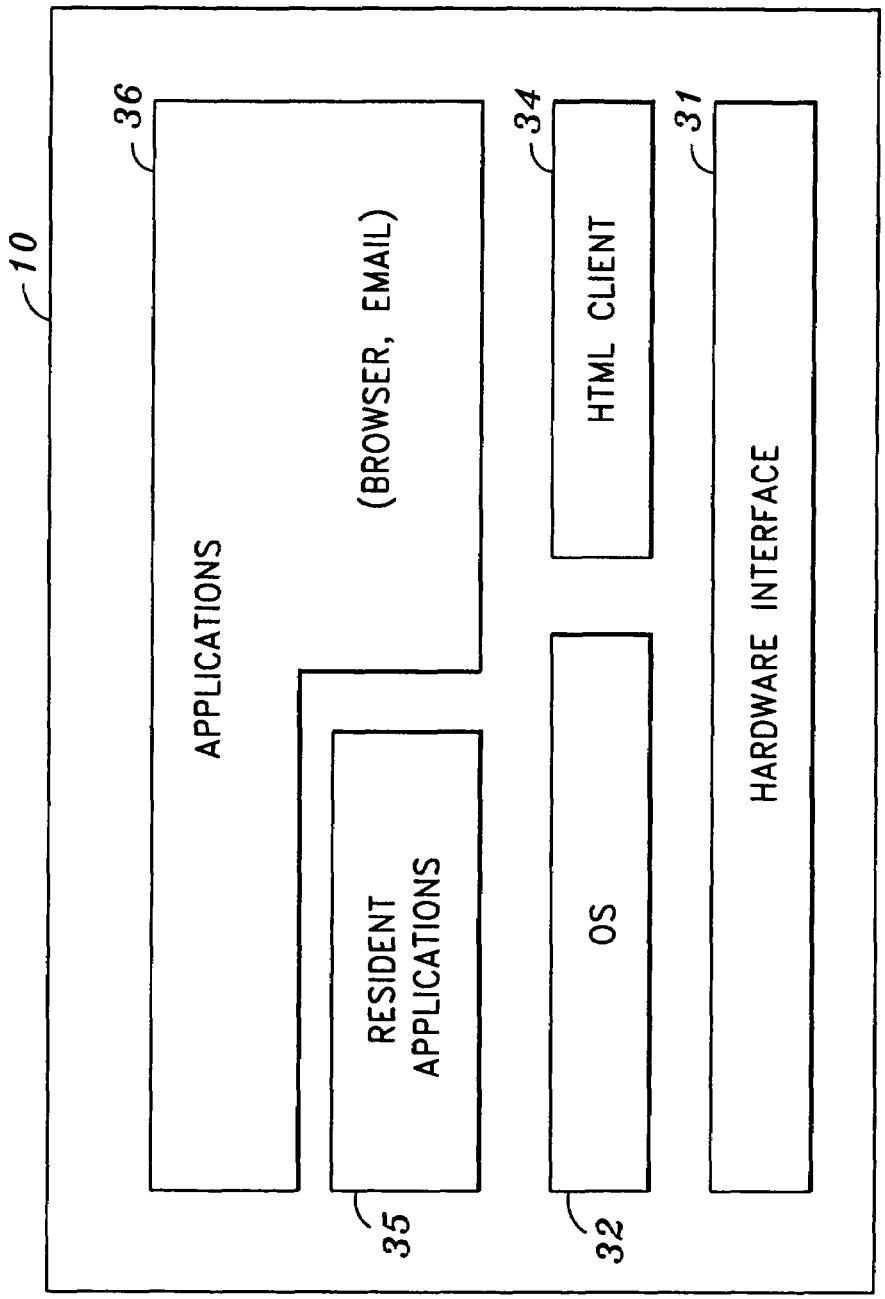
FIG. 2 illustrates representative software architecture of a set top box.

FIG. 2 illustrates representative software architecture of set top box 10. In general, this software architecture, together with the hardware architecture of the set top box, supports, in addition to the reception of analog and digital services, the transmission of digital image data and associated information.

Through the software architecture illustrated in FIG. 2, STB 10 hosts various applications that present to the home user functionality offered by various cable services. Typical applications are a navigator, an interactive program guide, electronic mail and a web browser. Most of these applications are client/server implementations, where STB 10 hosts the client software, and CHE 6 hosts the server software. Communication between client and server over the cable network is facilitated by an operating system executed on STB 10, and is performed through API's. One example of an API that may be used to communicate between CHE 6 and STB 10 is a broadband protocol transport (BPT) which is offered by Canon Information Systems, Inc. of Irvine, Calif. However, it should be apparent that any protocol suitable for use over a broadband network may be used with the present invention As is described herein, CHE 6 and STB 10 may communicate using the Hypertext Transfer Protocol (HTTP). Depending on the hardware platform and the operating system, applications may be resident at STB 10, or can be downloaded from a remote site including servers situated at, or available via, CHE 6 for execution at STE 10.

As shown in FIG. 2, software architecture and STB 10 includes an interface 31 to hardware, an operating system 32, an HTML client 34, resident applications 35, and other applications 36. As is described in more detail below, resident applications 35 includes a resident device module that operates to cause a loadable device module to be loaded. The loadable device module is configured to communicate with CHE 6 to transfer digital image data and associated information between STE 10 and CHE 6.

The operating system 32 is usually vendor-specific for the STE, and may include operating systems such as PowerTV, WinCE, MicroWare or OpenTV. HTML client 34 provides a group of independent handlers that can be plugged together in conformity to known plug-in specifications so as to provide ability to handle different types of media such as HTML, GIF, MPEG, HTTP, Java script, etc. The HTML client 34 is used to allow STB 10 to render HTML documents to a windows manager for display on the local television receiver. HTML documents may be retrieved from local cache, from in-band and out-of-band broadcast carrousels, VBI streams, HTTP proxy servers located at CHE 6, or remote HTTP servers accessed by STE 10 over the internet. In the latter case, documents retrieved from external web servers are filtered by a proxy according to predefined filtering criteria (such as surf watch), which also may convert requested documents into formats supported by the HTML client 34.

Resident applications 35 include such applications as the aforementioned resident device module, navigator, interactive program guide, and the like. Applications 35 and 36 include a web browser, an e-mail program, loadable device module, and the like.

Figure 3:
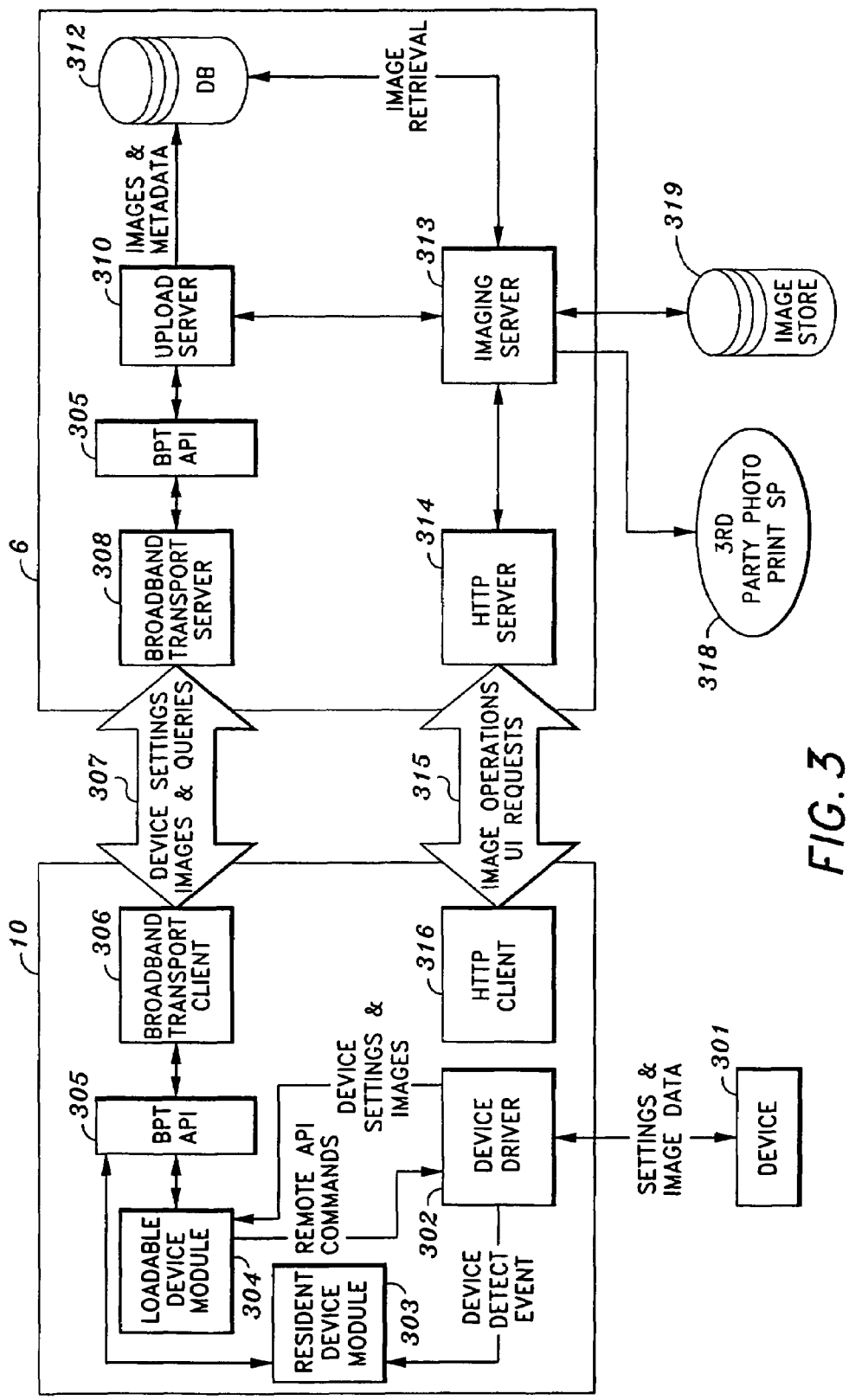
FIG. 3 provides an overview of an architecture for use in transferring digital image data and associated information between a cable head end and a set to box according to the present invention.

FIG. 3 provides an overview of an architecture for use in transferring digital image data and associated information between a cable head end and a set to box according to the present invention.

As part of hardware interface 31, device driver 302 provides an interface to device 301 external to STB 10 and connected via an interface to STB 10. Examples of such an interface include a Universal Serial Bus (USB), parallel and a IEEE 1394 interface connection. Device 301 is, for example, a digital device such as a still or video camera or a scanning device. Alternatively, device 301 may be a device (e.g., a reader) that is capable of retrieving data stored on a removable storage media such as a compact flash card, smart media or memory stick media, for example. Thus, device 301 is a digital image storage device that may or may not additionally be able to acquire, or capture, digital image data. Device driver 302 is configured to send and receive messages to and from device 301.

Device driver 302 detects device 301 when it is plugged into an external interface of STB 10. Information received by device driver 302 from device 301 is forwarded to resident device module 303. Such information includes type, or identification, information such as manufacturer and product identification information.

As is described in more detail below, resident device module 303 identifies an appropriate loadable device module 304 for use in communicating with device 301 and CHE 6 to transfer image data and associated information. Where the identified loadable device module 304 is not available on STB 10, resident device module 303 causes loadable device module 304 to be transferred to STB 10 and initiated on STB 10.

Loadable device module 304 communicates with upload server via a broadband protocol transport (BPT) application programming interface (API) 305 that interfaces with broadband transport client 306 and broadband transport server 308 components executing on STB 10 and CHE 6, respectively. Communication channel 307 is formed over broadband digital cable network and is used to transmit such information as device settings, images and queries, for example. In addition to transmitting image data and associated information, communication channel 307 may be used to request and receive loadable device module 304.

Image data received by upload server 310 is stored in database (or data store) 312. Requests for stored image data may be received by imaging server 313. For example, HTTP client 316 executing on STB 10 may forward a request (e.g., an Hypertext Markup Language, or HTML, request), via communication channel 315, for one or more images via HTTP server 314 to imaging server 313. In addition, imaging server 313 may receive an image request from an such internet sites as photo print service provider 318. Imaging server 313 retrieves images stored in database 312 in response to such request.

Figure 4A:
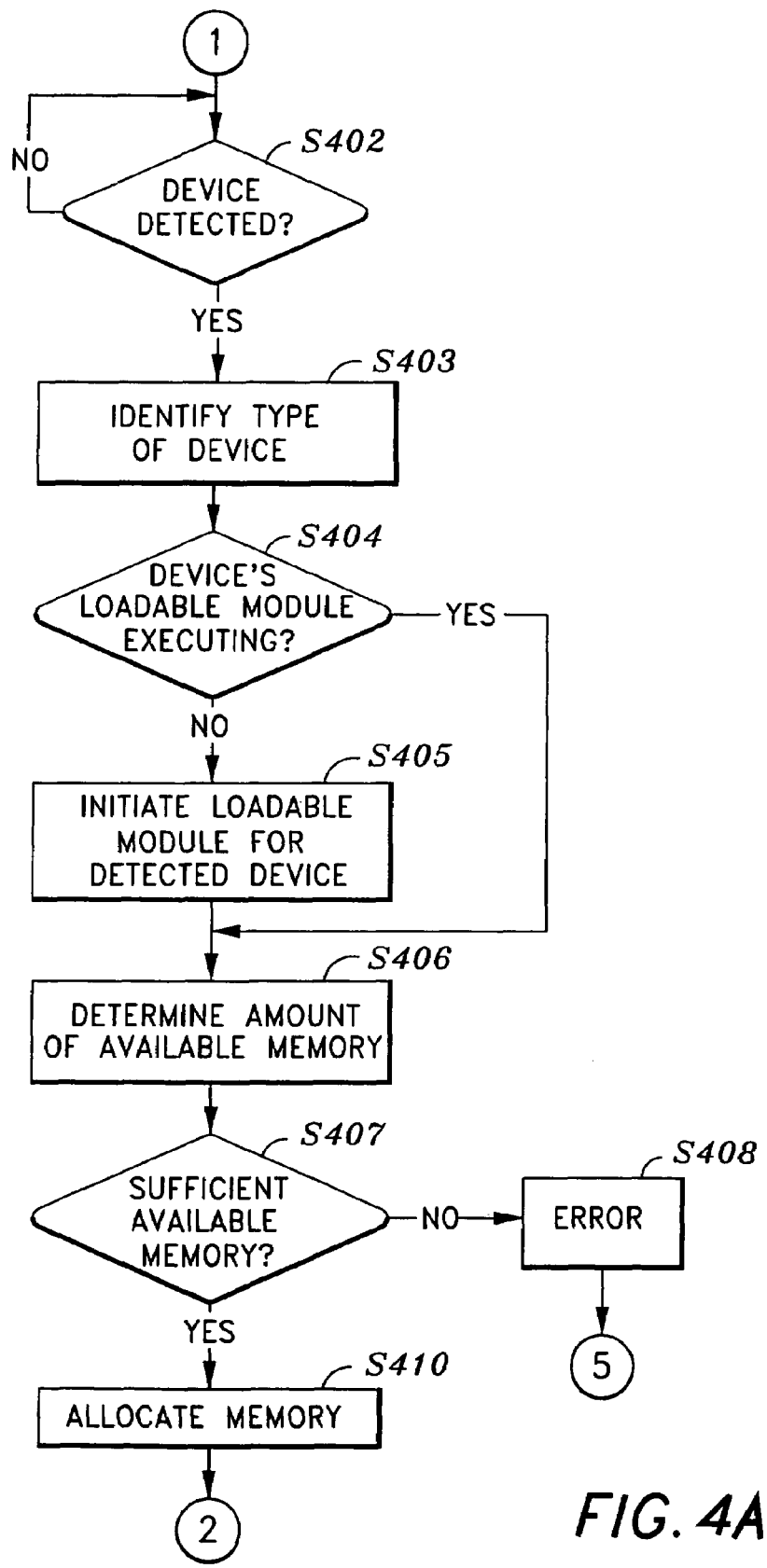
FIGS. 4A to 4C illustrate a flow diagram of process steps to upload images to a cable head end using a dynamically loadable module executing on a set top box according to the present invention.
Figure 4B:
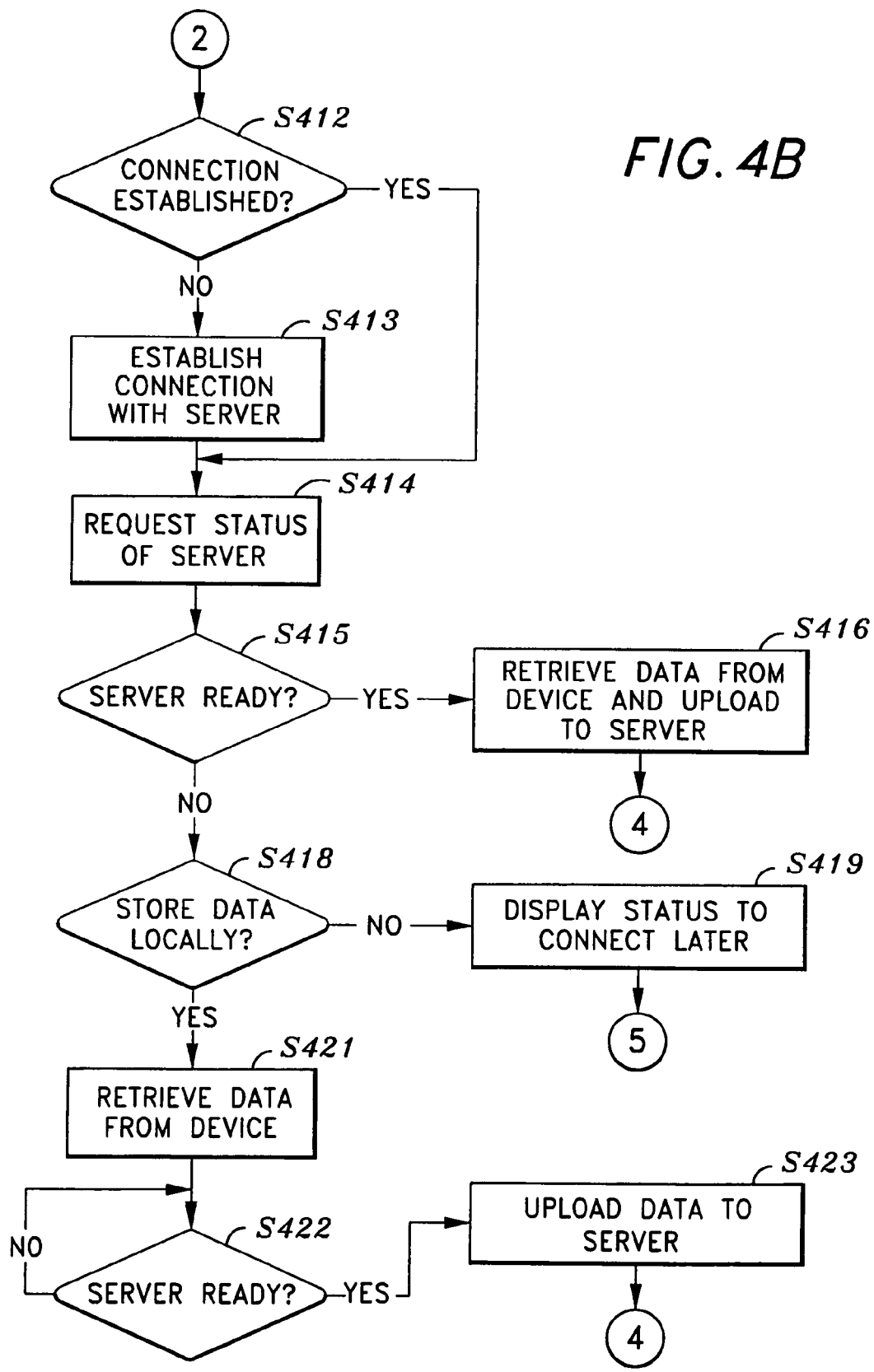
Figure 4C:
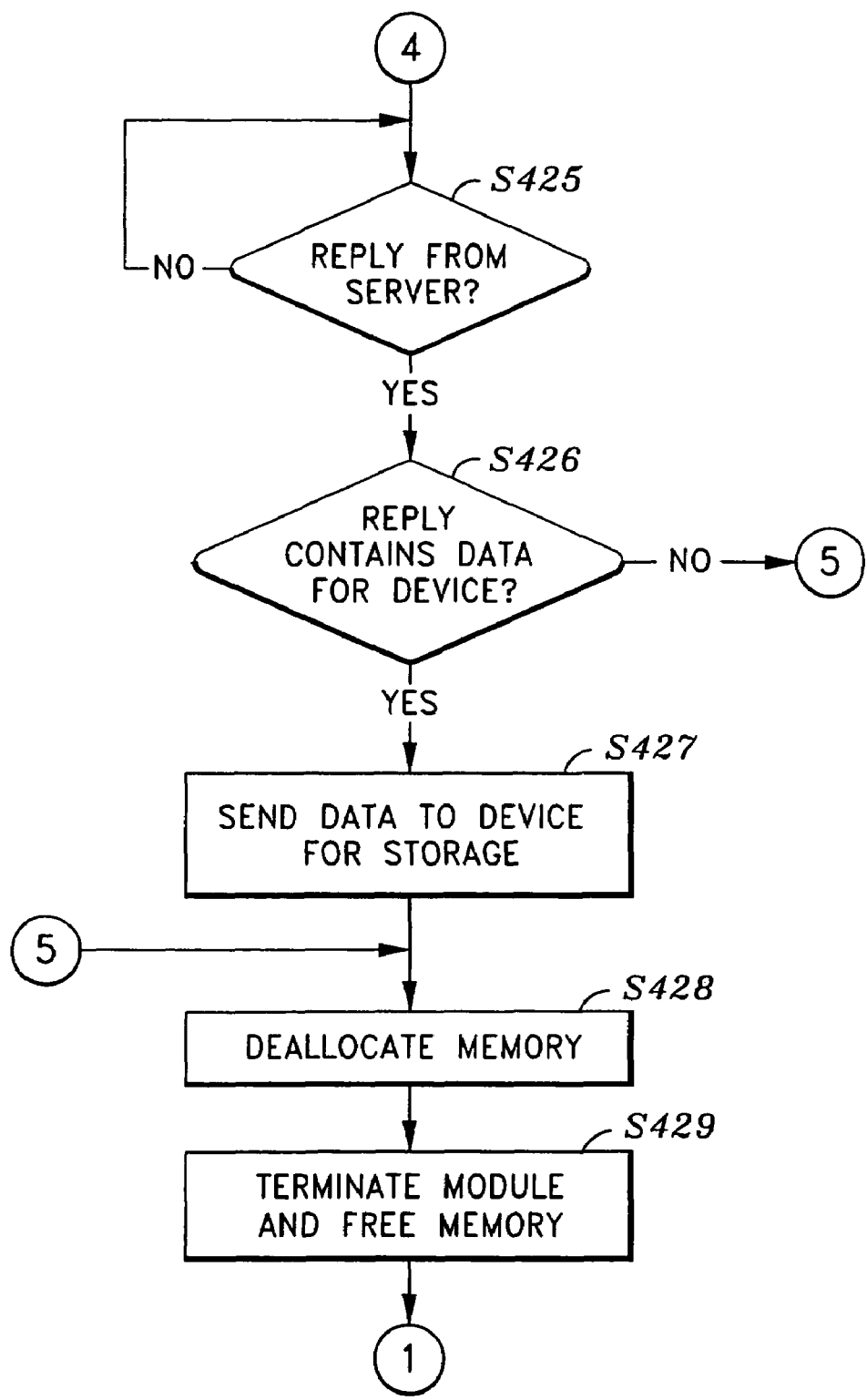

FIGS. 4A to 4C illustrate a flow diagram of process steps to upload images to a cable head end using a dynamically loadable module executing on a set top box according to the present invention.

Steps S402 through S405 are performed by resident device module 303 to identify loadable device module 304 and cause it to be initiated in STB 10. Loadable device module 304 performs steps S406 through S429 to transfer image data and associated information between STB 10 and CHE 6.

Referring to FIG. 4A, a determination is made whether a device has been detected. Resident device module 303 receives a message from device driver 302 when device 301 is connected which includes device information received from device 301. Resident device module 303 uses the device information to identify the type of device at step S403. For example, device 301 can transmit a manufacturer and model as device information. The device information is forwarded to resident device module 303 by device driver 302.

At step S404, resident device module 303 determines whether an appropriate loadable device module 304 is already resident in memory of STB 10. If not, processing continues at step S405 to locate loadable device module 304 in local storage of STB 10, or request loadable device module 304 from another location (e.g., CHE 6 or a server connected to CHE 6 via the internet).

Figure 5:
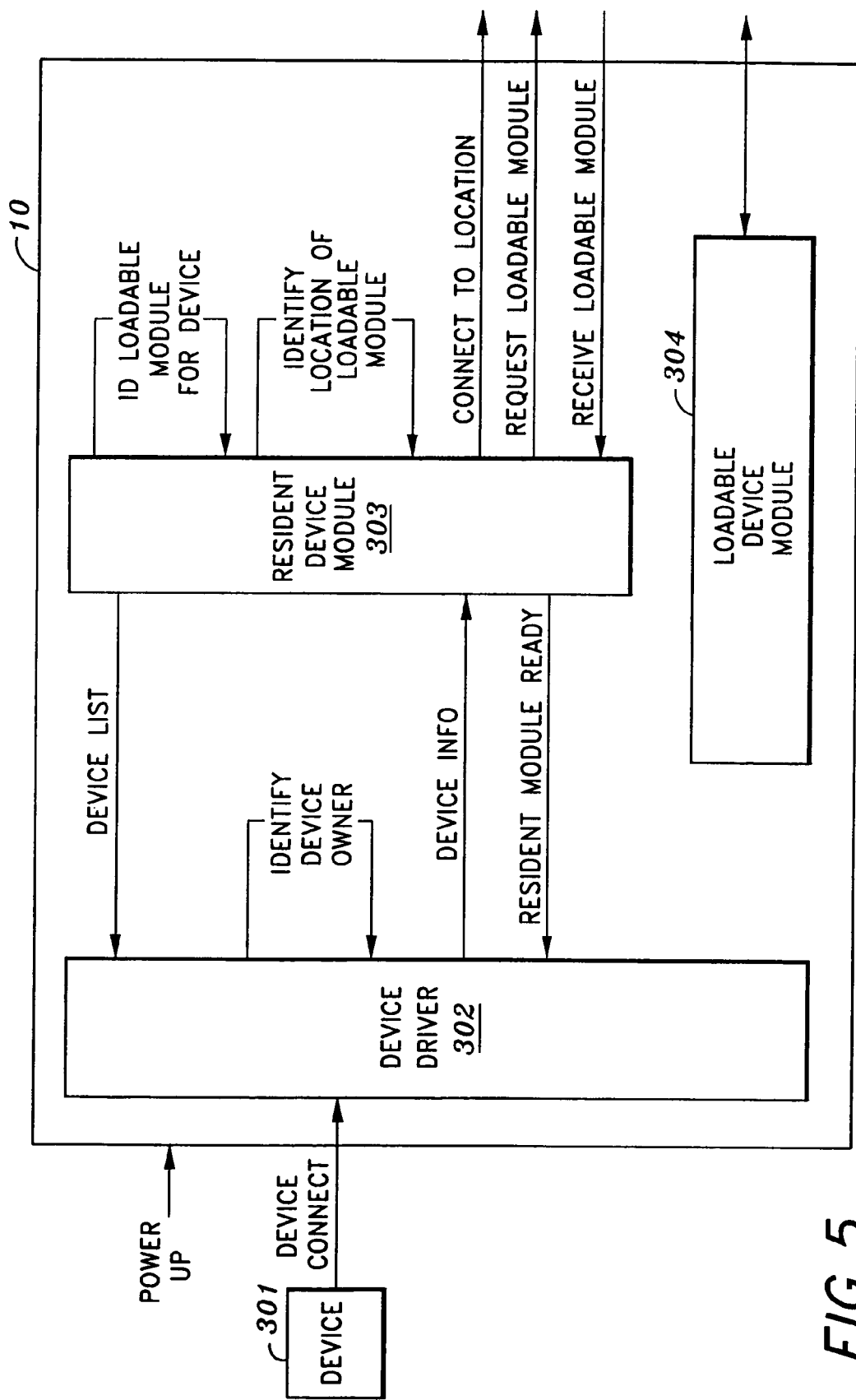
FIG. 5 provides a more detailed example of locating loadable device module 304 according to the present invention.

FIG. 5 provides a more detailed example of locating loadable device module 304 according to the present invention. At power up, device driver 302 and 303 are initiated and a list of device's that are supported are sent by resident device module 303 to device driver 302.

When device 301 is detected by device driver 302, device driver 302 uses the information received from device 301 to identify a device owner. Device driver 302 forwards the device information including device manufacturer and model information to resident device module 303. Resident device module 303 identifies an appropriate loadable device module 304 for use with the connected device 301 using, for example, a mapping mechanism (e.g., a table) that associates a manufacture, model or both with an instance of loadable device module 304.

Resident device module 303 determines whether the identified loadable device module 304 is already executing in STB 10. For example, loadable device module 304 may be loaded at power up, or may have been loaded to service this, or another, connected device 301. Loadable device module 304 may be loaded based on a user preference, for example.

If loadable device module 304 is not executing in STB 10 but is available from local storage, resident device module 303 causes loadable device module 304 from local storage. Otherwise, resident device module 303 connects to the identified location and requests resident device module 303. For example, resident device module 303 connects to CHE 6 via BPT API 305 and broadband transport client 305 to send a request for loadable device module 304. Upload server 310 can respond by sending loadable device module 304 to STB 10. Where loadable device module 304 is not available from storage of CHE 6, CHE 6 may request loadable device module 304 from internet site 8.

CHE 6 forwards loadable device module 304 to STB 10 and resident device module 303 which causes loadable device module 304 to begin execution in STB 10.

Referring again to FIG. 4A, loadable device module 304 identifies at step S406 an amount of available memory. At step S407, a determination is made whether there is sufficient available memory. Loadable device module 304, may elect to allocate enough memory to temporarily store all of the images that are to be uploaded to CHE 6 in a case, for example, CHE 6 is unavailable for an upload operation due to network congestion or CHE 6 is otherwise busy. Alternatively, loadable device module 304 may elect to allocate memory for storing some portion of the data so that data may be momentarily buffered when it is retrieved from device 301 before it is uploaded to CHE 6. The latter option may be selected where there is a limited amount of memory.

If it is determined by loadable device module 304, at step S407, that there is insufficient available memory, an error condition is raised and processing continues at step S428 to deallocate memory and terminate loadable device module 304.

It is determined, at step S407, that there is sufficient available memory, processing continues at step S410 to allocate an amount of memory determined by loadable device module 304. Processing then continues at step S412 to determine whether a connection has been established with CHE 6. In a case such as a broadband digital cable network, a connection established between CHE 6 and STB 10 may remain open between transfers. If a connection has already been established, processing continues at step S414. If not, processing continues at step S413 to establish a connection between STB 10 and CHE 6.

At step 414, loadable device module 304 inquires into the availability of CHE 6 to receive data transmissions. If it is determined at step S415 that CHE 6 is available, processing continues at step S416 to retrieve the data (e.g., image data) from device 303 and upload it to CHE 6. More particularly, loadable device module 304 retrieves image data and forwards the data along with a request to generate a broadband transport message to broadband transport client 306 via BPT API 305. Broadband transport client 306 transmits a formed message to broadband transport server 308 via BPT API 305. The data contained in a received broadband transport message is forwarded by broadband transport server 308 to upload server 310.

In addition to transmitting image data, Broadband transport server 308 and broadband transport client 306 may communicate with acknowledgments indicating that messages are received without error.

Once all of the image data has been retrieved from device 301 and transferred to CHE 6, processing continues at step S425 to await a reply from CHE 6 that all of the data has been received successfully. In addition, as is described in more detail below, CHE 6 may return information associated with the uploaded data (e.g., a identification and/or storage location) that is to be forwarded to device 301. Processing continues at step S426 to determine whether CHE 6 returned such information. If so, processing continues at step S427 to send the data received from CHE 6 to device 301. Processing then continues at steps S428 and S429 to deallocate memory and terminate loadable device module 304.

If it is determined, at step S415, that the server is not ready to receive the data to be uploaded, processing continues at step S418 to determine whether the data to be retrieved from device 301 may be stored in memory of STB 10. Loadable device memory 304 may determine whether the amount of memory allocated in step S410 is sufficient to store the image data. If not, loadable device module 304 may attempt to allocate additional memory. In any case, if there is insufficient memory to store the data, processing continues at step S419 to display a status to the user. Processing continues at steps S428 and S429 to deallocate memory and terminate loadable device module 304.

Alternatively, where it is undesirable for STB 10 to store the image data, a user may be given the option to leave device 301 connected to STB 10, and wait for CHE 6 to initiate an upload. In such a case, once CHE 6 initiates the upload, processing continues at step S416 to retrieve the data from device 301 and upload it to CHE 6.

If it is determined at step S418 that there sufficient local storage, loadable device module 304 retrieves the data from device 301 via device driver 302 at step S421 and stores the retrieved data locally. A status (e.g., success or failure) of the data retrieval may be displayed to the user.

In a case that CHE 6 previously indicated a "not ready" status (e.g., in a case that CHE 6 and/or the network is busy), it notifies STB 10 when it is ready to receive the data. At step S422, loadable device module 304 awaits the availability of CHE 6. When a "ready" indication is received, processing continues at step S423 to upload the stored data to CHE 6. In such a case, the data previously retrieved from device 301 is forwarded to broadband transport client 306 to broadband transport server 308 via BPT API 305. Alternatively, where device 301 remains connected to STB 10, loadable device module 304 may retrieve the data from device 301.

Broadband transport server 308 forwards the uploaded data to upload server 310. Processing continues at step S425 to await a status at CHE 6, forward data received from upload server 310 to device 301 and terminate loadable device module 304 as previously described.

A user interface is provided with the present invention in response to a connection of device 301 being detected. FIGS. 6A through 6D provide an example of a user interface according to the present invention.

Figure 6A:
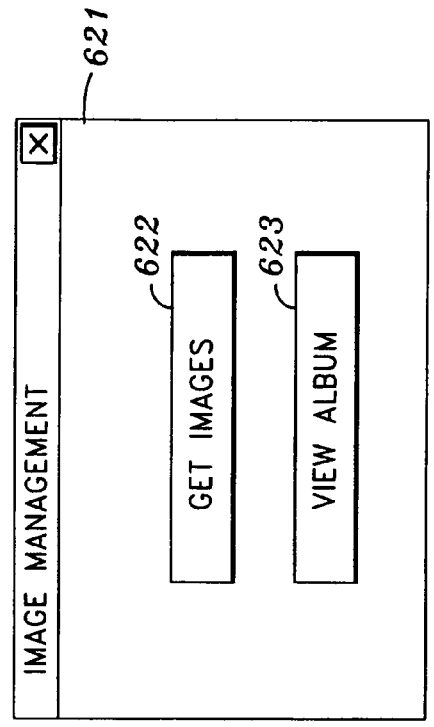
FIGS. 6A through 6D provide an example of a user interface according to the present invention.

Referring to FIG. 6A, a user is presented with the options, in display 601, of logging in, or initiating a "one-click" image upload operation. By selecting the "one-click" operation, images may be uploaded from device 301 using a single selection, or click. The "One Click" option is selectable by, for example, a click of a button (e.g., of a mouse, television remote control or other pointing device) when the cursor is positioned on, or over, option 301.

In response to the single click, all of the images that are currently stored on device 301 are retrieved from the camera and stored in an image database. A unique identifier, or token, is generated which is associated with the stored images, and the token is saved in storage of device 301. Thereafter, the images may be retrieved from storage using the token stored in device 301. That is, the token is retrieved from device 301 and used to retrieve the associated images from storage. The images may then be displayed in such a way that the user may scroll through them to identify the ones that are to be retained or deleted.

Figure 6B:
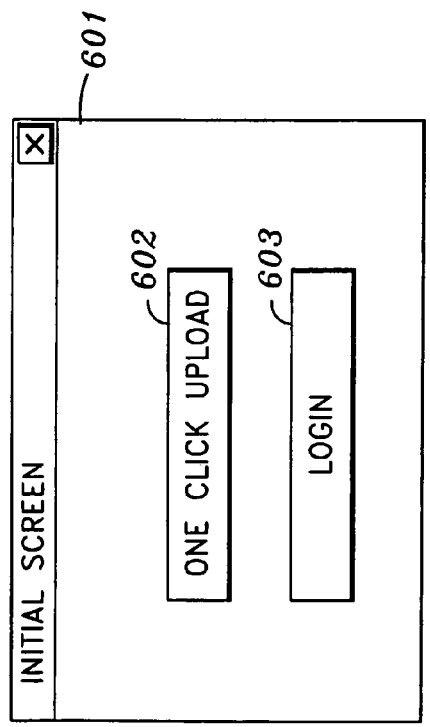
Figure 6C:
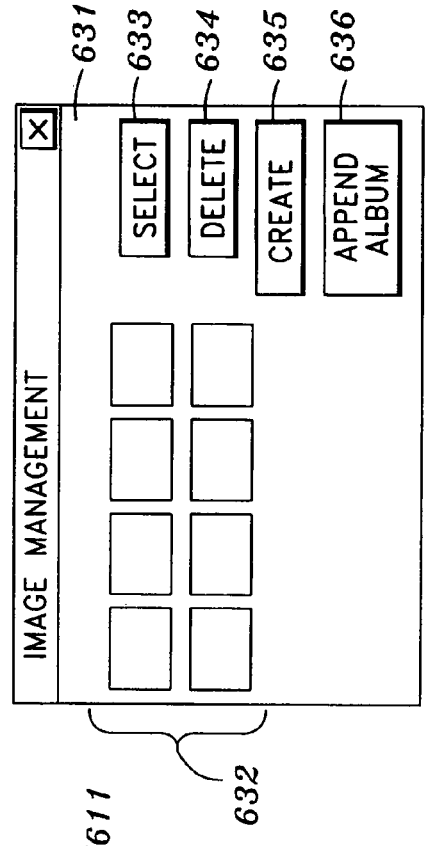
Figure 6D:
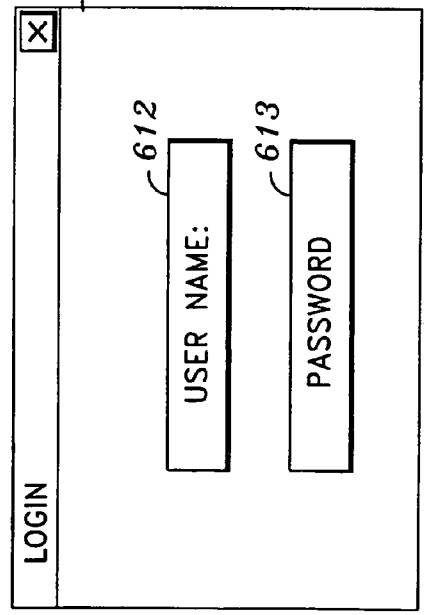

For example, referring to FIG. 6D, thumbnail images 632 of the uploaded images may be displayed in display 631. The user may select some or all of the images for deletion or for storage in a new or existing album using options 633 through 636.

Display 611 of FIG. 6B allows a user to login by entering a user name and password in input fields 612 and 613, respectively. Alternatively, it may only be necessary to specify a user name. In either case, a user name may be specified using a keyboard or a pointing device to identify the user name one character at a time, or from a list of displayed user names. A password may be entered using a input device such as a keyboard or pointing device as well.

If a valid user name (and password, if required) is entered, display 621 of FIG. 6C is displayed which allows a user to get images stored in an album using selection option 623. In addition, a user may retrieve images uploaded to CHE 6 via a "one-click" operation by selection option 622. When option 622 is selected, a token that is stored in connected device 301 is retrieved from device 301 and used to retrieve the uploaded images.

Figure 7A:
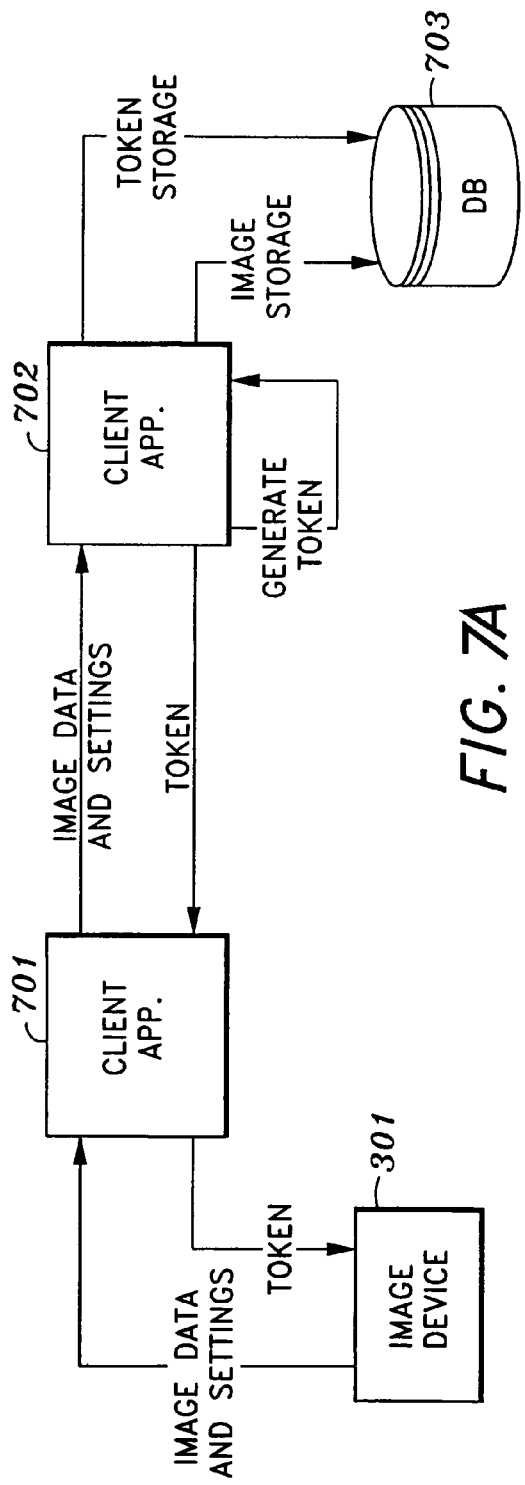
FIGS. 7A and 7B provide an overview of a "one-click" operation according to the present invention.
Figure 7B:
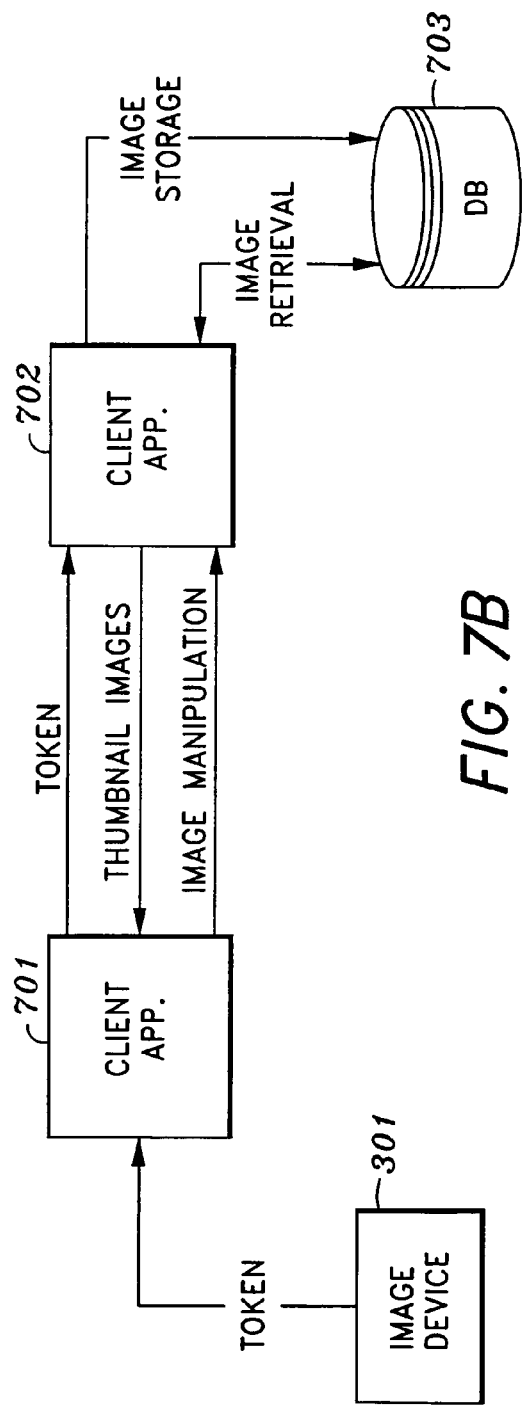

FIGS. 7A and 7B provide an overview of a "one-click" operation according to the present invention. Referring to FIG. 7A, image data and device identification (or settings) are retrieved from device 301 by client 701. Client 701 may be STB 10 which executes loadable device module 304 and HTML client 316, for example. Client 701 transfers the retrieved image data and settings to server 702. Server 702 may be CHE 6 which executes upload proxy 310, imaging server 313 and HTTP server 314, for example.

As discussed above, communication channel 307 may be used to upload image data and setting from client 701 to server 702, and to return a token for storage by device 301. Communication channel 315 may be used to transfer a user interface such as that described above with reference to FIGS. 6A through 6D. In addition, communication channel 315 may be used to transmit a user's requests for "one-click" uploaded images. Preferably, communication channel 307 is used to transfer the images to client 701. HTTP client 316 receives HTML page definitions from HTTP server 314, and generates a display (e.g., displays 601, 611, 621 and 631). The HTML page definitions may be provided by HTTP server 314, imaging server 313 or both.

Server 702 generates a token which is associated with the uploaded image data using the settings retrieved from device 301. The token may be, for example, an identifier associated with device 301, the user or both. In addition, the token includes an identifier that uniquely identifies the image data uploaded in the current "one-click" operation.

The uploaded image data along with an associated token are then saved to storage in database, or datastore, 703. The token is transmitted by server 702 to client 701. Client 701 causes the token to be stored in storage of device 301. Preferably, the token is stored in place of, or as a substitute for, the uploaded image data to which the token is associated thereby freeing storage of device 301 for other usage (e.g., storage of additional images).

A user may request the image data uploaded via a "one-click" operation. For example, a user may select option 622 of display 621. In response to such a selection, client 701 retrieves the stored token from device 301. Client 701 forwards the retrieved token to server 702. Server 702 retrieves the images associated with the token from database 703. The images (e.g., thumbnail images) are sent to client 701 which displays the images as in display 631, for example.

Operations including image deletions, image selections for inclusion in an album and/or album creations are transmitted to server 702. Server 702 saves those images selected by the user for inclusion in an album in database 703 with an association to a selected album.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A method of controlling a set top box that communicates with a cable head end over a network, the method comprising the steps of:
   detecting a connection of an external digital device;
   providing a user interface in response to detection of the connection of the external digital device;
   receiving data from the external digital device, when an upload operation is initiated on the user interface;
   determining whether or not said cable head end is ready to receive the data to be uploaded from said set top box;
   uploading the data to said cable head end over the network, in case of a determination that said cable head end is ready to receive the data; and
   storing the data locally in the set top box, in case of a determination that said cable head end is not ready to receive the data.

2. A method according to claim 1, wherein said set top box is remotely controlled.

3. A set top box for transferring data stored in an external digital device which is connectable to and disconnectable from said set top box wherein said set top box transfers the data to a cable head end with which said set top box communicates over a network, said set top box comprising:
   a device module which detects connection of the external digital device to said set top box;
   a display control module which provides a user interface in response to detection of the connection of the external digital device to said set top box;
   an internal memory for temporary storage of data received from said external digital device;
   a determination unit for determining whether or not said cable head end is ready to receive data; and
   an upload unit for uploading the data stored in said internal memory over the network;
   wherein, responsive to an upload operation initiated on the user interface, said upload unit uploads data received from the external digital device to said cable head end over the network, in a case where said determination unit determines that said cable head end is ready to receive the data; and
   whereas, responsive to an upload operation initiated on the user interface, data received from the external digital device is stored locally in said internal memory, in a case where said determination unit determines that said cable head end is not ready to receive the data.

4. A set top box according to claim 3, wherein said set top box is remotely controlled.

5. A computer-readable memory medium in which computer-executable process steps are stored, the process steps for controlling a set top box that communicates with a cable head end over a network, wherein the process steps comprise:
   a detecting step to detect a connection of an external digital device;
   a providing step to provide a user interface in response to detection of the connection of the external digital device;
   a retrieving step to retrieve data from the external digital device, when an upload operation is initiated on the user interface;
   a determining step to determine whether or not said cable head end is ready to receive data to be uploaded from said set top box;
   an uploading step to upload the data to said cable head end over the network, in case of a determination that said cable head end is ready to receive the data; and
   a storing step to store the data locally in the set top box, in case of a determination that said cable head end is not ready to receive the data.

6. A computer-readable memory medium according to claim 5, wherein said set top box is remotely controlled.

7. A method according to claim 1, wherein the external digital device is a still camera, a video camera or a scanning device.

8. A set top box according to claim 3, wherein the external digital device is a still camera, a video camera or a scanning device.

9. A computer-readable memory medium according to claim 5, wherein the external digital device is a still camera, a video camera or a scanning device.

10. A method according to claim 1, wherein after local storage of the data in a case where said cable head end is not ready to receive the data, said set top box awaits a determination that said cable head end has become ready to receive the data, and uploads the data to said cable head end over the network after it is determined that said cable head end has become ready to receive the data.

11. A method according to claim 10, wherein after it is determined that said cable head end has become ready to receive the data, the data for upload is re-received from the external digital device if the external digital device is still connected.

12. A method according to claim 10, wherein after it is determined that said cable head end has become ready to receive the data, the data for upload is retrieved from local storage.

13. A method according to claim 1, wherein the determination of whether the cable head end is ready to receive data comprises establishment of a connection from said set top box to said cable head end over the network, and a request from said set top box to said cable head end over the connection for status of said cable head end.

14. A set top box according to claim 3, wherein after local storage of the data in a case where said cable head end is not ready to receive the data, said set top box awaits a determination that said cable head end has become ready to receive the data, and uploads the data to said cable head end over the network after it is determined that said cable head end has become ready to receive the data.

15. A set top box according to claim 14, wherein after it is determined that said cable head end has become ready to receive the data, the data for upload is re-received from the external digital device if the external digital device is still connected.

16. A set top box according to claim 14, wherein after it is determined that said cable head end has become ready to receive the data, the data for upload is retrieved from local storage.

17. A set top box according to claim 3, wherein the determination of whether the cable head end is ready to receive data comprises establishment of a connection from said set top box to said cable head end over the network, and a request from said set top box to said cable head end over the connection for status of said cable head end.

18. A computer-readable memory medium according to claim 5, wherein after local storage of the data in a case where said cable head end is not ready to receive the data, said set top box awaits a determination that said cable head end has become ready to receive the data, and uploads the data to said cable head end over the network after it is determined that said cable head end has become ready to receive the data.

19. A computer-readable memory medium according to claim 18, wherein after it is determined that said cable head end has become ready to receive the data, the data for upload is re-received from the external digital device if the external digital device is still connected.

20. A computer-readable memory medium according to claim 18, wherein after it is determined that said cable head end has become ready to receive the data, the data for upload is retrieved from local storage.

21. A computer-readable memory medium according to claim 5, wherein the determination of whether the cable head end is ready to receive data comprises establishment of a connection from said set top box to said cable head end over the network, and a request from said set top box to said cable head end over the connection for status of said cable head end.

* * * * *